Feb. 24, 1953 — T. H. SAWYER — 2,629,862

METHOD AND MEANS OF MEASURING CURRENT COLLECTOR WEAR

Filed Sept. 30, 1950 — 2 SHEETS—SHEET 1

INVENTOR.
THOMAS H. SAWYER
BY
ATTORNEY

INVENTOR.
THOMAS H. SAWYER
BY
ATTORNEY

Patented Feb. 24, 1953

2,629,862

UNITED STATES PATENT OFFICE 2,629,862

METHOD AND MEANS OF MEASURING CURRENT COLLECTOR WEAR

Thomas H. Sawyer, Mansfield, Ohio, assignor to The Ohio Brass Company, Mansfield, Ohio, a corporation of New Jersey Application September 30, 1950, Serial No. 187,731

17 Claims. (Cl. 340—213)

1

This invention relates to a mechanism and a system whereby the wear on a current collector may be indicated when the current collector has worn a predetermined extent, and has particular reference to the wear of the insert used with the collector.

Current collector heads at the present day are almost exclusively equipped with renewable carbon inserts especially where they are used in connection with trolley bus systems and also to quite an extent in connection with street car systems.

The wear upon such carbon inserts is fairly rapid in some cases depending upon conditions of weather, extent of daily mileage, condition of the overhead trolley system etc. and since each trolley bus is equipped with two such current collector heads, the matter of a daily inspection is quite necessary and expensive especially where the number of vehicles operating on a system is extensive. The wear upon an all metal current collector is much less rapid than in case of a carbon insert.

By providing the trolley system with checking stations and equipping each trolley wire at such stations with a contactor and associating with the contactors a specially designed control and indicating system, it is possible to determine when the insert has worn to its limit without lowering each trolley pole on which the current collector head is mounted, for a visual examination.

It is the purpose of this invention to provide a contactor and signal system for indicating by lights, bells, electric horns etc. when the limit of wear of the current collector or insert has been reached as the vehicle passes a station at which point such indicating equipment has been installed, and such indication is made without the necessity of causing the vehicle to stop for an examination unless the system indicates the advisability of such examination of the insert or inserts.

It is the further purpose of this invention to provide indicating means to inform the user whether the same is in normal working condition.

Systems have been proposed involving the use of electro-magnetic relays which however are not sufficiently sensitive to be reliable especially when the vehicle passes the test station at a too rapid rate or the engagement between the current collector head and the contactor is not positively and properly made.

In the drawing—

Fig. 1 is a side view in partial section of the contactor referred to above mounted on a short length of trolley wire.

2

Figure 1:
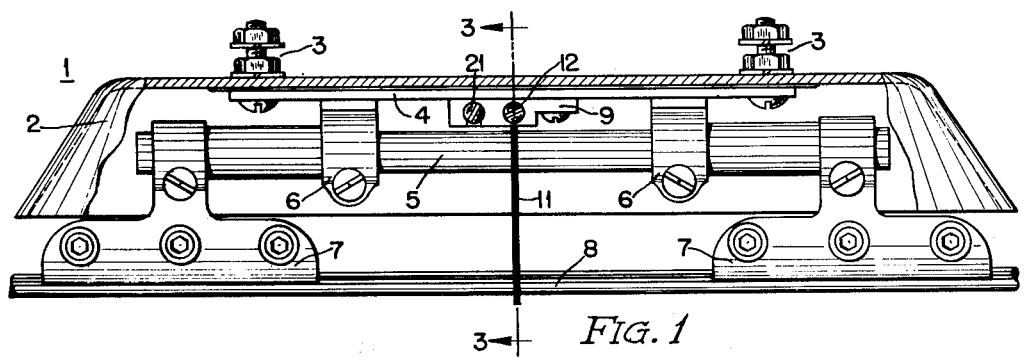

Referring now to Figs. 1 to 5 inclusive, while there are numberous contactor constructions which may be used, the preferred contactor 1 comprises an inverted elongated receptacle number 2 formed of metal open on one side which acts as a main support and cover. Secured to the cover 2 by means of bolts 3, is an insulator support 4 of metal supporting an elongated rod or body 5 of insulation by means of brackets 6 forming integral parts of the support 4, and secured to each end of the insulating rod 5 is a trolley wire clamp 7. A section of trolley wire 8 shows the method of mounting the contactor thereto.

Secured to and supported by the support 4 and intermediate the ends thereof is a yieldable metallic contact support 9 in electrical connection with the main support 2 through the insulator support 4.

The contact support 9 is provided with oppositely disposed through openings 10 to receive the elongated contacts 11 which are secured to the contact support 9 by the screws 12. The free end of the contacts extends to a point below the trolley wire clamps, the distance depending upon the size of the trolley wire and the amount of allowable wear of the current collector or insert. A single contact may be used if desired.

The openings 10 extending through the contact support 9, permit of the vertical adjustment of the contacts 11 and which are held in their adjusted position by the screws 12. To have access to the screws 12, the cover or main support 2 is provided with an opening 13 opposite each screw 12.

The contacts 11, preferably two in number, function better if of a resilient material such as hard-drawn bronze or spring steel such as piano wire and may be of comparatively small size to yield when contacted by the current collector head 14. The free end of the contactors will be movable in a circle if made of wire with a round cross-section but the contacts will bend in only one direction namely, parallel to the trolley wire or axis of the member 5 if of a rectangular cross-section and properly placed.

A current collector head now in general use is shown in U. S. Patent 2,044,886 and corresponds to the head 14 of Figs. 4 and 5, and comprises the trolley bowl 15 and current collector or insert holder 16. The insert is shown as 17.

Figure 4:
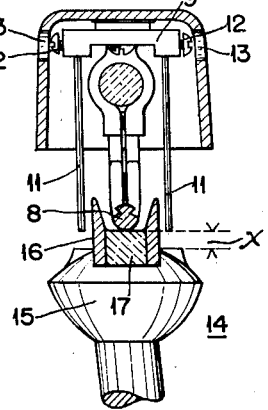
Fig. 4 shows a current collector head with a new or unworn insert crossing the contactor and having reached a point corresponding to the line 3—3 of Fig. 1.

In Fig. 4 a section of the contactor 1 is shown in combination with a current collector head 14, which has a new or unworn insert 17 and the spring contacts 11 have been so adjusted with respect to the trolley head 14 or bowl 15 that the two will not engage until the insert has worn a groove of predetermined depth as indicated by the space $x$. Fig. 4 shows what may be termed a normal passing of the current collector 16.

Figure 5:
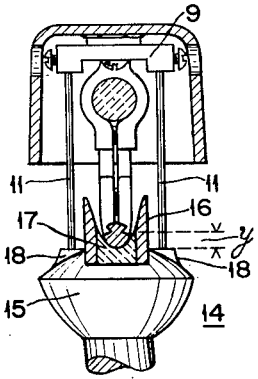
Fig. 5 shows a similar view to Fig. 4 in which the insert is worn (note groove) and contact made between the contactor elements and the collector head, thus energizing the contactor elements and closing a circuit at the contactor with the trolley wire.

In Fig. 5 is shown the same combination as in Fig. 4, but the insert is shown as having a groove worn therein of the predetermined depth $y$ and which is equal to the space $x$. The insert having worn the allowable depth, contact means 18 on the trolley head 14 or bowl 15 engages the contacts 11 thereby electrically connecting the trolley wire 8 to the contacts 11 and closing any circuit with the trolley wire which is connected to the contactor. Engagement between the current collector head and the contacts 11 is momentary in case of a moving vehicle.

Connection to the indicating system may be had through means of the opening 20 in the contact support 9 and screw 21 or directly to the main support by means of bolts 3.

Figure 6:
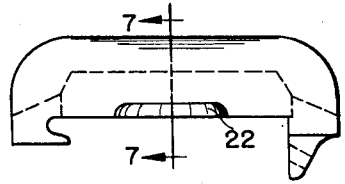
Fig. 6 is a side view of a current collector.
Figure 7:
Fig. 7 is a section on the line 7—7 of Fig. 6.

Figs. 6 and 7 relate to a current collector which may be used to engage not only the trolley wire but with the contacts 11 in place of the members 18 on the bowl 15, and consist of the outwardly projecting flanges 22, on one or both sides of the collector body. The current collector may be a unit of all metal, that is, omitting the carbon insert shown in section in Fig. 7 and filling the space thereof with metal.

The current collector is the subject matter of divisional application, Serial No. 323,001, filed November 28, 1952.

Figure 8:
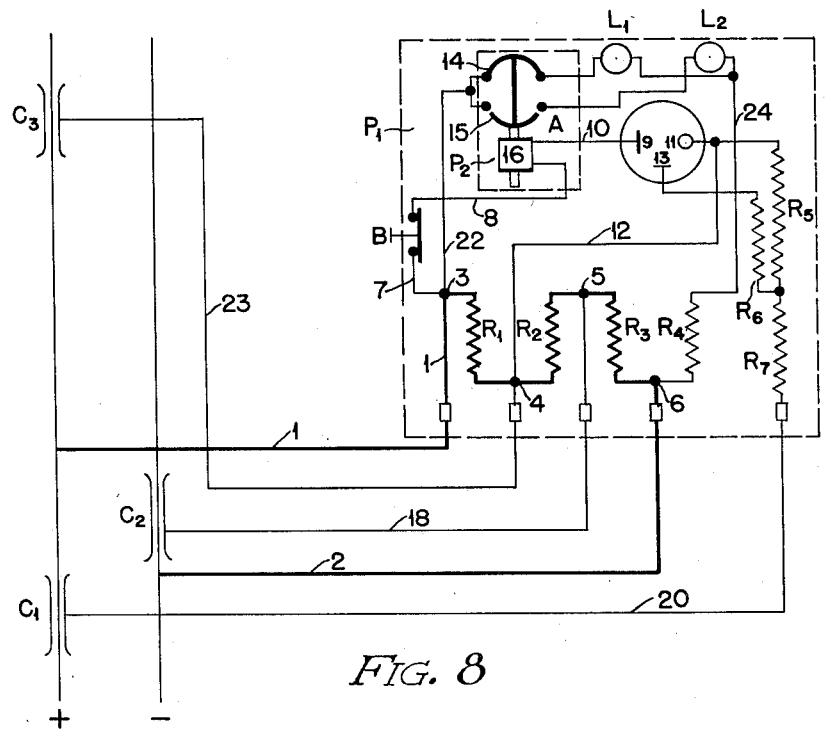
Fig. 8 is a diagram of the control and indicating system for use with double trolley or trolley coach operation.
Figure 9:
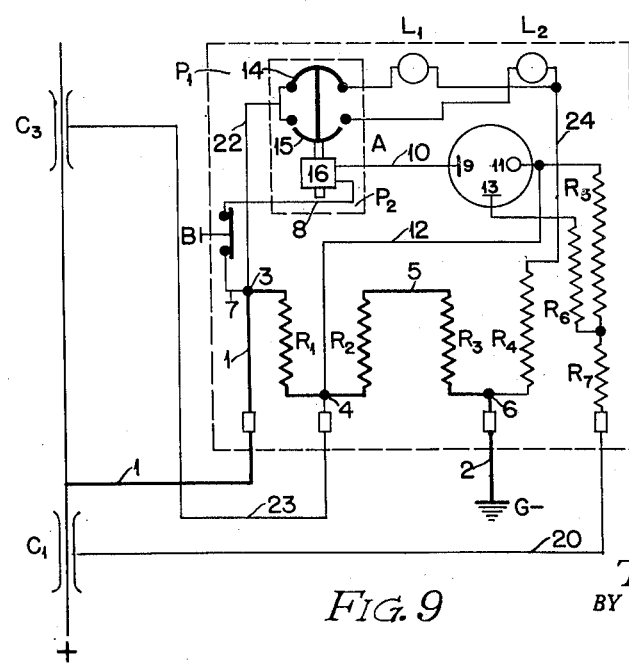
Fig. 9 is a diagram of a modified system shown in Fig. 8 when adopted to single trolley or street car operation.

Referring now to Figs. 8 and 9, Fig. 8 shows a signal system for indicating the normal operating condition of the system and will also indicate the ultimate wear upon the current collectors or upon the inserts used therewith and might be referred to as an inspection station previously mentioned. Fig. 9 is the same but for a street car system using a grounded negative.

In the systems shown in Figs. 8 and 9 a gas-triode tube T is used as it has been found to be very sensitive which is not the case with electro-magnetically operated relays. The gas-triode tube acts as a sensitive electronic switch for opening and closing the circuit through an electro-magnetically operated circuit changer relay A.

Each trolley wire of a trolley bus system is provided with a contactor $C_1$ and $C_2$ respectively, shown in Figs. 1 to 5 inclusive and spaced apart longitudinally although they may be installed opposite each other and are for the purpose of functioning when the allowable depth of wear on the current collector or its insert is reached to close a circuit with the associated trolley wire thus electrically connecting the signal system to the trolley wires providing a passing current collector or its insert has worn a predetermined amount.

A third contactor $C_3$ may be used with the positive trolley wire to effect an automatic reset of the system to its normal condition if it has operated to indicate a worn current collector or insert.

Three resistors $R_1$, $R_2$ and $R_3$ are connected in series and constitute a voltage divider connected directly to the trolley wires by conductors 1 and 2 respectively and having taps at 3, 4, 5 and 6 thereby breaking down the trolley voltage between taps into units the voltage of which depend upon the resistance of the resistor or resistors between taps. Another purpose of the voltage divider is to provide taps for the negative contactor $C_2$ and for the reset contactor $C_3$. Another purpose of the voltage divider is to provide a source of voltage lower than trolley voltage having reasonably good regulation. The voltage divider is normally energized.

The gas-triode tube T is a cold-cathode, starter-anode tube of glow-discharge type and has an anode 9, a cathode 11 and starter-anode 13, and is for the purpose of initiating and controlling the current flow through relay A when one of the contactors $C_1$ or $C_2$ is closed as by a passing trolley head with a worn current collector or insert and maintaining the current flow until the voltage across the tube is intentionally removed and the tube opened so to speak. For this reason the tube is sometimes referred to herein and in the claims as an electronic switch.

Relay A is electro-magnetically operated and is provided with two sets of double break contacts 14 and 15 for selectively controlling the operation of the indicating lights $L_1$ and $L_2$ respectively the contacts 14 being normally closed. A single coil 16 operates to close the contacts 15, when energized, and is of such resistance as to limit the D.-C. anode current of the tube to a safe value.

The purpose of resistor $R_1$ is to provide the proper operating voltage for the relay A and the tube T at the minimum trolley voltage of the overhead system which may vary say from around 500 to 600 volts.

The system is provided with a manually operated reset button type switch B which is normally closed. The reset switch B, the coil 16 of relay A and the tube T are connected in series and in turn connected in shunt across resistor $R_1$, between the taps 3 and 4, the circuit including conductor 7, reset switch B, conductor 8, coil 16, conductor 10 to anode 9 of the tube T, and from cathode 11 of tube T, through conductor 12 to tap 4. The voltage across $R_1$ is normally held sufficiently low at the maximum trolley voltage to prevent operation of the tube T until one of the contactors $C_1$ or $C_2$ is closed by a passing trolley head with a worn current collector. Normally no current flows through the circuit just described as connected to taps 3 and 4 due to the tube T not being sufficiently energized. The only purpose of the reset switch B is to interrupt the tube and relay circuit thus opening the electronic switch and de-energizing relay A, and returning the system to normal.

Current may be initiated through the tube T by increasing the voltage from the anode 9 to the cathode 11 so that it equals or exceeds the peak anode breakdown voltage of the tube as by closing contactor $C_2$ and also by increasing the voltage from the starter anode 13 to the cathode 11 so that it equals or exceeds the peak positive starter-anode breakdown voltage as by closing contactor $C_1$.

The purpose of resistor $R_3$ is to provide a tap point 5 to which the negative contactor $C_2$ may be connected through conductor 18.

The purpose of the contactor $C_2$ is to provide a circuit closing means when a trolley head in which the collector has reached its allowable wear passes contactor $C_2$.

When an insert or current collector has reached its allowable wear and passes $C_2$ contactor, conductor 18 is momentarily connected to the negative trolley (Fig. 5). This places a short across $R_3$ through conductors 2 and 19 connected to taps 5 and 6. This shorting-out of $R_3$ raises the voltage across $R_1$ and $R_2$. The values of $R_1$ and $R_2$ are so chosen that, with $R_3$ shorted out, the voltage across $R_1$ equals or exceeds the peak anode breakdown voltage of tube T.

Since previously no current was flowing through the tube and relay, the full voltage now across $R_1$ is applied between the anode 9 and the cathode 11 of the tube thus initiating a current flow through the electronic switch T.

The resistances $R_1$, $R_2$ and $R_3$ are so chosen that with all three resistors in series and current flowing through the tube and relay, the voltage across $R_1$ will be equal at least to the sum of the relay operating voltage and the anode drop of the tube, so that the tube or electronic switch will remain closed and continue to conduct and energize the relay A.

Resistors $R_5$ and $R_7$ provide a second voltage divider to provide a voltage across the resistor $R_5$ equal at least to the peak positive starter-anode breakdown voltage when the positive contactor $C_1$ is engaged by the trolley head (Fig. 4) providing the current collector or insert has reached its allowable wear (Fig. 5).

The purpose of the $C_1$ contactor is to provide a circuit closing means when a positive trolley head with a current collector which has reached its allowable wear engages the contactor thereby connecting resistor $R_7$ to the positive trolley through conductor 20.

$R_5$ has one end connected to cathode 11 of the tube T and the other end connected to one end of resistor $R_7$ while the other end of $R_7$ is connected by conductor 20 to the positive contactor $C_1$. The starter anode 13 of the tube T will not be subjected to voltage or current until contactor $C_1$ is closed (Fig. 5).

When contactor $C_1$ is closed by a worn insert the series connected resistors $R_5$ and $R_7$ are in shunt with $R_1$ through conductor 20, $C_1$ and conductor 1 to tap 3 and through conductor 12 to tap 4. Therefore the voltage of $R_1$ is momentarily placed across $R_5$ and $R_7$.

The resistance of $R_5$ and $R_7$ is high relative to that of $R_1$ so that the addition of the resistances $R_5$ and $R_7$ will not appreciably lower the voltage across $R_1$. The voltage appearing across $R_5$ and imposed on starter anode 13 will then be equal to or greater than the peak positive starter-anode breakdown voltage.

One end of resistor $R_5$ is connected to the cathode 11 of tube T while the other end is connected to the starter-anode 13 through resistor $R_6$.

The purpose of $R_6$ is to limit the starter-anode current to a safe value.

The voltage now appearing between the starter-anode 13 and the cathode 11 initiates a current between these elements. When the starter-anode voltage is removed, as when $C_1$ is opened through the passing of the current collector, the current shifts to flow between the anode 9 and the cathode 11 causing current to flow through relay A via conductor 10, relay coil 16, conductor 8, switch B, conductors 7 and 1 to the positive trolley wire.

The tube T will continue to conduct current, thus energizing relay A, until the voltage between anode 9 and cathode 11 is intentionally removed by operating the switch B or automatically by the current collector engaging the contactor $C_3$.

The contactor $C_3$ may be of a different construction from that of $C_1$ and $C_2$ in that a circuit is closed at each passing of the trolley head regardless of the wear if any upon the current collector or insert; see U. S. Patent 2,195,734.

The contactor $C_3$ is a voltage contactor, the purpose being to provide automatic resetting of the system; that is, return it to normal when a trolley head passes through $C_3$. When this takes place conductor 23 is connected to the positive trolley thus shorting out $R_1$ since conductor 1 is also connected to the positive trolley.

Since resistor $R_1$ is now shorted out, the voltage between the anode 9 and cathode 11 is reduced to zero so that the current through the tube, acting as a closed electronic switch, is interrupted hence relay A is de-energized. Automatic reset is not necessary when the system is equipped with push button switch B.

$L_1$ is an indicator which is normally lit and indicates the system is in operative condition and consists preferably of a light bulb.

$L_2$ also a light bulb indicates when lit that one of the contactors $C_1$ or $C_2$ is or has been engaged and closed by a worn current collector.

Resistor $R_4$ is a voltage reducing resistor the sole purpose being to limit the voltage appearing across $L_1$ and $L_2$ to the normal operating voltage of the bulbs.

Normally with no current flowing through coil 16 of relay A, current flows from the positive trolley through conductors 1 and 22, through contacts 14 of relay A, $L_1$, conductor 24, resistor $R_4$, and back to the negative trolley wire through conductor 2 thus indicating the system is in operative condition.

When either contactor $C_1$ or $C_2$ or both are engaged by an ultimately worn current collector or insert, the coil 16 of relay A will be energized and the contacts 14 opened and contacts 15 closed, then current flows from positive trolley through conductors 1 and 22, contacts 15 of relay A, $L_2$, conductor 24, resistor $R_4$, and back to negative trolley through conductor 2.

The system thus disclosed may be applied to a single trolley (street car) system in which the only difference is the negative side of the first voltage divider is grounded by eliminating contactor $C_2$ and conductor 18 and connecting conductor 2 to ground (Fig. 9) since in street car operation the negative side of the circuit is grounded at the source of power.

It is evident that to reset either system (Figs. 8–9) using only manual means all that is necessary is to omit $C_3$ contactor and conductor 23 and either open switch B or short circuit $R_1$ as by means of a push button switch.

The electrically operated signal portion of the above described systems may be enclosed in a receptacle about 12 inches each way and such receptacle is indicated by dotted lines P₁; the panel on which the relay A is mounted is indicated by dotted lines P₂ and is also mounted in the receptacle.

Figure 2:
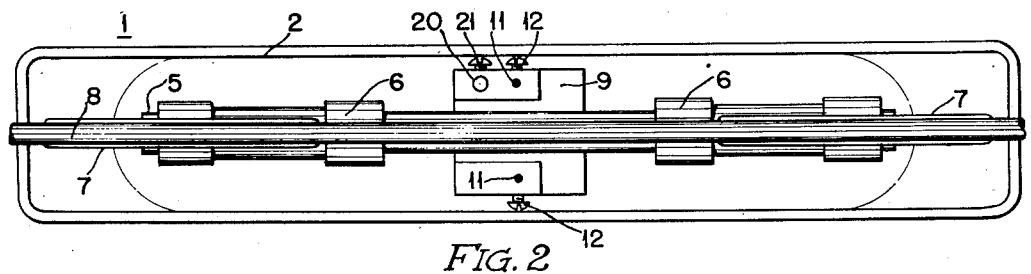
Fig. 2 is a bottom plan view of Fig. 1.
Figure 3:
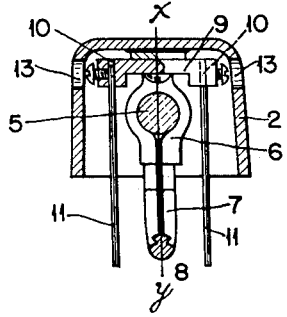
Fig. 3 is a transverse section on the line 3—3 of Fig. 1.

The conductors 18 and 20 may be secured to the contactors by means of the supporting bolts 3 or connected directly to the contact support 9 through means of the opening 20 and screw 21 (Figs. 1 and 2).

The following data is given merely as an example and should be considered as illustrative and not taken in a limiting sense, since other tubes and elements and arrangements thereof may be used.

The tube T, selected for this example and previously referred to is one known as gas-triode cold cathode starter-anode type OA4-G.

To accommodate the system to the above tube, the resistors are calculated as follows—$R_1$ and $R_3$, 3000 ohms; $R_2$, 2000 ohms; $R_4$ and $R_7$, 10,000 ohms; $R_5$, 50,000, and $R_6$, 500,000 ohms.

Lights, each 120 volts, 6 watts.

The trolley voltage is usually 500 volts to 600 volts D. C.

The relay to operate at about 120 volts.

The normal voltage across $R_1$ is less than the peak anode breakdown voltage of the tube. When $R_3$ is shorted, the voltage across $R_1$ equals or exceeds the PAB voltage causing the tube to conduct, as when $C_2$ is engaged by a worn current collector.

When $C_1$ is closed the voltage across $R_5$ is 156–188 which is applied to the starter anode 13 and causes the tube to break down since the $R_5$ voltage exceeds the PPS—AB voltage.

The above values are given merely as illustrative in connection with a system using the type of tube named. Other tubes or other values for the above tube may be employed.

While this invention has been described as applying to the indication of worn current collectors and inserts therefor it may be used for other purposes as for instance to register the number of vehicles passing a given point by extending the projection of the contacts 11 to engage the trolley head at each passing of a vehicle, or modified contactors of the type $C_3$ used which will function regardless of the condition of the current collector and substituting an electrically controlled counter or recorder in place of the relay A.

By inspection, it will be evident that the system employed in Fig. 9 for single trolley street car operation is the same as in Fig. 8 for two trolleys except the grounding of the negative tap point 6.

It will be evident to one skilled in the art that the system shown in Fig. 9 may be simplified by eliminating the second voltage divider together with $R_6$ and conductor 20, then connecting the tap point 3 to ground and connecting tap point 5 to contactor $C_1$; contactor $C_3$ and conductor 23 should be eliminated and the tube T reversed by connecting anode 9 to conductor 12 and connecting cathode 11 to conductor 10.

If it is desired to employ a negative trolley with a grounded positive, it is only necessary to eliminate $R_5$, $R_6$ and $R_7$, also $C_3$ and conductor 23, then connect tap point 3 to positive ground and tap point 6 to the negative trolley.

For simplicity the term current collector is used herein and in the claims to include an all metal current collector or a collector employing a carbon insert as in U. S. Patent 2,185,270, both forming part of the trolley head subject to wear.

"Normally" refers to the condition of the invention before operation by a passing worn current collector or its condition after reset after such operation. The term "signal operating system" includes all elements of Figs. 8 and 9 except the trolley wires and contactors.

It is to be understood that although certain specific embodiments of the invention have been illustrated and described, it is not limited to the particular arrangements shown, to the elements described and to the values given, but that in its broadest aspects it includes all equivalent embodiments and modifications which come within the scope of the appended claims.

I claim:

1. In combination, a pair of trolley wires of opposite polarity, a contactor associated with each wire and engageable by a passing trolley head provided with a current collector, each contactor being so constructed and arranged and so related to the associated trolley wire that the contactor will be momentarily closed with respect to its trolley wire when a trolley head with a current collector which has worn a predetermined amount, passes the contactor but which contactor is not affected by the passing of a trolley head at other times and normally remains open with respect to its trolley wire, electrically controlled means to selectively indicate whether either one or both contactors are normally open or have been closed by a passing trolley head with said worn current collector, the said means comprising a voltage divider energized directly from both trolley wires, a second voltage divider energized from a portion of the first voltage divider, a selectively controlled electrically operated circuit changer energized from a portion of the first voltage divider, a gas-triode tube to selectively initiate and maintain a current flow through the operating means of the circuit changer, a pair of signals controlled by the circuit changer to indicate the aforesaid condition of the contactors after the passing of the trolley head, the aforesaid elements forming the said electrically controlled means being so constructed related and connected that the first voltage divider is constantly energized and the voltage across that portion of the voltage divider to which the operating means of the circuit changer is connected is normally less than the peak anode breakdown voltage of the tube and which voltage across the said portion of the first voltage divider remains substantially unchanged when either or both contactors are engaged by passing trolley heads providing the heads do not close the contactors with respect to the associated trolley wire, the said second voltage divider becoming energized only when the positive contactor is closed with respect to its trolley wire at which time the voltage across a portion of the second voltage divider is not less than the peak positive starter-anode breakdown voltage of the tube thereby initiating a current flow through the operating means of the circuit changer and thereby changing the signal indicator from normal, when the negative contactor is closed with respect to its trolley wire a portion of the first voltage divider will be short circuited thereby raising the voltage across the remaining portion of the divider to a value at least equal to the peak anode breakdown voltage of the tube thereby initiating a current flow through the operating means of the circuit changer and thereby changing the signal indication from normal, normally open contactor means associated with the positive trolley wire and spaced from the other positive contactor to be engaged by the passing trolley head and closed with respect to the associated trolley wire and connected to the first voltage divider whereby the voltage maintaining the tube active is automatically reduced to zero, thereby returning the said electrically controlled means to normal.

2. An indicating system for an overhead trolley system comprising, a pair of contactors associated with a pair of trolley wires of opposite polarity and each contactor adapted to momentarily close a circuit with its associated trolley wire by a passing trolley head providing the current collector thereof has worn a predetermined amount, a voltage divider comprising a plurality of resistors connected in series and the series directly connected to the trolley wires to break down the trolley voltage into units of required values, an electrically operated circuit changer relay having a pair of normally closed contacts and a pair of normally open contacts, each pair of contacts including an indicator controlled by the position of the circuit changer relay and connected across the voltage divider, a voltage sensitive electronic switch connected in series with the operating coil of the relay, the switch and coil connected across a portion of the resistors, the voltage delivered by the said portion of the resistors being normally too low to cause the electronic switch to close, a conductor connecting another portion of the resistors to the negative contactor whereby the said another portion will be short circuited should the negative contactor be closed by a passing trolley head engaging the negative contactor thereby raising the voltage across the first said resistor portion of the voltage divider to a value sufficient to energize the electronic switch and create a flow of current through the relay coil thereby effecting a closing of the normally open relay contacts and an opening of the normally closed contacts and thereby alternating the energization of the indicators, the electronic switch remaining closed until the circuit therethrough is opened, a second voltage divider comprising a plurality of resistors connected in series and in turn connected across the first said portion of the resistors of the first said voltage divider should the positive contactor be closed by a trolley head engaging the same, the electronic switch being connected across a resistor of the said second voltage divider whereby the electronic switch is energized and closed when the positive contactor is closed thereby energizing the relay coil and effecting a closing of the normally open contacts of the circuit changer relay and an opening of the normally closed contacts thereof thereby reversing the energization of the indicators, the electronic switch remaining closed until the circuit therethrough is opened, and means to open the circuit through the relay coil and electronic switch.

3. An indicating system for a trolley system comprising, a pair of trolley wires of opposite polarity, a contactor associated with each wire, each contactor adapted to be closed by a passing trolley head, a normally energized voltage divider comprising a plurality of series-connected resistors connected directly to the trolley wires to break down the trolley voltage into steps of predetermined values, a pair of signal devices to indicate the normal condition of the system and also a condition when either one or both contactors have been closed by a passing trolley head, an electrically operated circuit changer to control the operation of the said signal devices, a normally open circuit connected across a portion of the voltage divider and including the circuit changer coil and an electronic tube to control the circuit, a normally open circuit including the negative contactor connected across another portion of the voltage divider whereby the last said portion will be short circuited when the negative contactor is closed as by a passing trolley head thereby raising the voltage on the first said portion of the voltage divider whereby the said electronic tube will be energized and close the circuit thereby energizing the circuit changer coil and operating the circuit charger whereby one of the signal devices will indicate the negative contactor had been temporarily closed by a passing trolley head, a second normally non-energized voltage divider circuit comprising a pair of series-connected resistors and the normally open positive contactor connected across the first said portion of the first voltage divider, the last said voltage divider circuit being energized when the positive contactor has been temporarily closed as by a passing current collector, a portion of the said electronic tube connected across one of the resistors of the second voltage divider circuit whereby the tube is energized when the resistors of the second voltage divider are energized should the positive contactor have been closed thereby energizing the coil of the circuit changer whereupon one of the indicating devices will indicate the closing of the positive contactor by a passing trolley head.

4. In combination a pair of trolley wires of opposite polarity, a normally open contactor associated with each wire and engageable by a passing trolley head whereby the contactors will be closed with respect to the associated trolley wire if the current collector has been worn a predetermined amount, a plurality of signal devices, a circuit changer connected to the signal devices to control the sequence of operation thereof, one device to indicate the contacts are open circuited and another device to indicate either one or both contactors had been closed, electric means to operate the circuit changer, a voltage divider connected directly to the trolley wires to divide the voltage thereof into a plurality of units of desired values, a second voltage divider connected across a portion of the first voltage divider to break down the voltage thereof into a plurality of units of desired values, a cold-cathode starter-anode type of tube to control the operation of the circuit changer and connected in series with the electric means, the tube and electric means connected across a portion of the first voltage divider, the tube also connected across a portion of the second voltage divider, one contactor connected to the first voltage divider and the other contactor connected to the second voltage divider, whereby the operation of the tube is effected when either one or both contactors have been closed thereby creating a flow of current through the electric means and changing the normal condition of the circuit changer.

5. The combination set forth in claim 4 characterized by the combination therewith of means associated with one of the trolley wires and connected to the first said voltage divider and engageable by the current collector after engagement with one of the first said contactors to reset the system to normal.

6. An indicating system deriving its energy from a source of electric power comprising, a trolley wire forming one leg of the source of electric power, a normally open contactor associated with the trolley wire and arranged to be closed by a passing trolley head, a signal operating system connected to the contactor and directly to the trolley wire and to the other leg of the source of power, a plurality of indicating devices and electrically operated means to selectively control the alternate energization of the indicating devices, the indicating devices and the electrically operated means being so constructed, related and connected that one indicating device will indicate the normal condition of the signal operation system as when the contactor is normally open and another indicating device will indicate the contactor has been closed as by a passing trolley head.

7. An indicating system as set forth in claim 6 characterized by the signal operating system including electronic means to control the energization of the electrically operated means.

8. An indicating system as set forth in claim 6 characterized by the signal operating system including electronic means to effect continuation of the indication by the said another indicating device caused by the contactor having been temporarily closed, and means to de-energize the electronic means and reset the signal operating system to normal.

9. In combination, a pair of power conductors of opposite polarity, a normally open contact device associated with each conductor and closable with respect to the associated conductor, a normally energized voltage divider connected to the conductors, a second normally non-energized voltage divider connected across a portion of the first voltage divider and including one of the contact devices, an electrically operated circuit changer, an electronic tube comprising an anode and a cathode and a starter-anode to control the operation of the circuit changer, the anode and cathode connected in series with the circuit changer operating means and the two connected across a portion of the first voltage divider, the voltage of the portion being normally less than the peak anode breakdown voltage of the tube, the starter-anode and the cathode being connected across a portion of the second voltage divider, the voltage across the last said portion of the second divider being at least equal to the peak positive starter-anode breakdown voltage of the tube when the controlling contact device has been closed thereby creating a flow of current through the circuit changer operating means which flow continues after the contact device has opened, the other contact device connected to the first voltage divider whereby another portion of the divider is shunted out when the contact device has been closed thereby raising the voltage of the first said portion of the first voltage divider to a value at least equal to the peak anode breakdown voltage of the tube thereby creating a current flow through the circuit changer operating means which continues after the contact device has opened, a pair of indicating devices connected to the circuit changer to indicate whether the contact devices are open or have been closed, and means to check the flow of current and return the system to normal.

10. In combination, a source of current having one side grounded, a normally open circuit closing means associated with the ungrounded side of the source of current and closable with respect thereto, a plurality of indicating devices, an electrically operated circuit changer connected to the indicating devices to control the sequence of operation of the devices, one device indicating when the system is normal and the circuit closing means is open and another device indicating the circuit closing means has been temporarily closed, a voltage divider directly connected to the source of current, a second voltage divider including the normally open circuit closing means connected across a portion of the first voltage divider, a gas-filled anode cold-cathode starter-anode type of tube to control the operation of the circuit changer, the tube including the anode and the cathode and the said operation means for the circuit changer connected across a portion of the first voltage divider, the tube including the starter-anode and the cathode connected across a portion of the second voltage divider, the normal voltage across the said portion of the first voltage divider being less than the peak anode breakdown voltage of the tube, the normal voltage across the said portion of the second voltage divider upon closing the circuit closing means being at least equal to the peak positive starter-anode breakdown voltage of the tube, and means to de-energize the said portion of the first voltage divider.

11. A signal operating system comprising, a pair of voltage dividers, one divider directly connectable across a source of current supply, the other divider deriving its energy from a portion of the first voltage divider with an interposed normally open-circuit closing-means, a plurality of indicating devices energized from the first voltage divider, electrically operable means to selectively connect the indicating devices to a portion of the first voltage divider depending upon whether the electrically operable means is energized or non-energized, an electronic tube of the cold-cathode anode starter-anode type to control the operation of the said electrically operable means and deriving energy from each voltage divider when energized, circuit means including a normally open-circuit closing-means connected to the said one voltage divider at an intermediate point whereby a portion of the said one divider may be short circuited thereby raising the voltage of the remaining portions of the said one voltage divider when the normally open-circuit closing-means is closed, and means to control the voltage across the electronic tube to return the circuit changer to its normal condition.

12. An indication system comprising, a source of current, a voltage divider consisting of a plurality of resistors normally connected in series and in parallel to the source of current supply, a plurality of indicating devices, an electro-magnetic operated circuit changer connected to the indicating devices to alternately energize the same as the system conditions change, means whereby one device is normally energized, an energizing circuit for operating the circuit changer and thereby energize the other indicating device, the said circuit connected in shunt with a portion of the voltage-divider and including the relay coil and a normally open voltage controlled electronic switch, the switch comprising an anode and a cathode normally non-closable until the voltage across the said portion of the voltage divider equals at least the peak anode breakdown voltage of the switch, normally open circuit closing means associated with the source of current supply, means associated with the voltage divider and connected to and controlled by the said normally open circuit closing means whereby the voltage across the said portion of the voltage divider will be raised to a value at least equal to the peak anode breakdown voltage of the switch to effect closure of the said electronic switch and create a current flow therethrough and through the circuit changer coil and thereby energize and operate the circuit changer whereby the normally non-energized indicating device will be energized and showing the normally open circuit closing means has been closed.

13. An indicating device as set forth in claim 12 characterized by the electronic switch remaining closed and supplying a flow of current to the relay coil after the normally open circuit closing means has been opened, and means to open the circuit which includes the electronic switch whereupon the switch will be de-energized and the current therethrough reduced to zero thereby de-energizing the circuit changer relay and returning it to its original normal condition.

14. The combination set forth in claim 12 having in combination therewith means whereby the circuit supplying current to the circuit changer coil may be opened thereby de-energizing the coil and returning the circuit charger to its original normal position.

15. The combination set forth in claim 12 characterized by having a second normally open circuit closing means associated with the current supply circuit and connected to the voltage divider whereby the said portion of the voltage divider will be short circuited when the said second normally open circuit closing means is closed, thereby reducing the voltage across the said portion of the voltage divider to zero whereby the voltage between the said anode and the said cathode is reduced to zero and the current through the tube and circuit changer coil is interrupted.

16. In combination, a normally open contactor adapted to be mounted on a trolley wire and an indicating system provided with means to indicate when the contactor has been closed, the contactor being so constructed and arranged as to be electrically closed with respect to the trolley wire when engaged by a passing trolley head with a current collector which has worn a predetermined amount, the indicating system arranged for connection to the contactor and to the trolley wire circuit and provided with signal means, the indicating system being so constructed and so arranged as to energize the signal means when the contactor is closed as described above.

17. The combination set forth in claim 16 characterized by the indicating system being provided with a plurality of signal means, one signal means indicating the contactor as in its normally open condition and another signal means indicating the contactor as having been closed, and means selectively controlling the energization of the signal means.

THOMAS H. SAWYER.

REFERENCES CITED

The following references are of record in the file of this patent:

UNITED STATES PATENTS

| Number | Name | Date |
| --- | --- | --- |
| 501,258 | Sears | July 11, 1893 |
| 1,788,941 | Bradley et al. | Jan. 13, 1931 |
| 2,146,357 | Schweikle | Feb. 7, 1939 |
| 2,217,176 | Madison | Oct. 8, 1940 |
| 2,267,559 | Foster | Dec. 23, 1941 |
| 2,468,509 | Naab | Apr. 26, 1949 |